March 24, 1942.	A. NEVEU	2,277,137
BRAKE MECHANISM
Filed Aug. 9, 1939	3 Sheets-Sheet 2
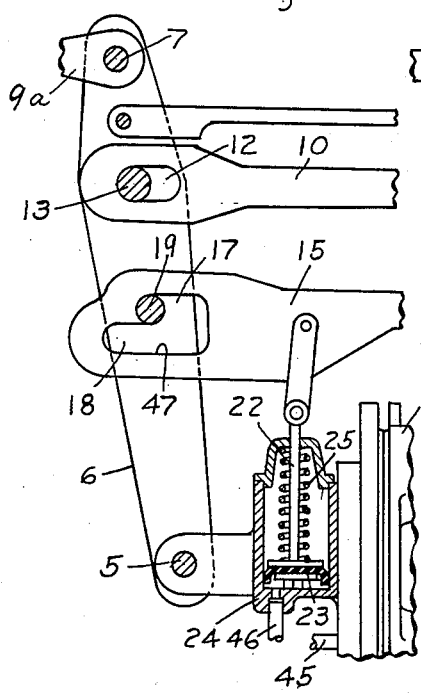
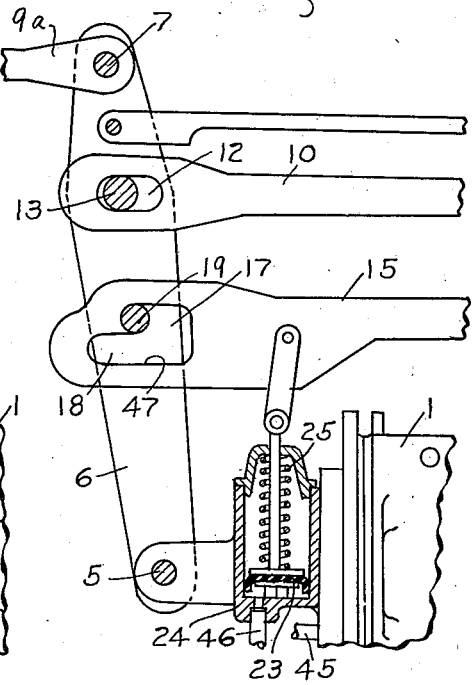
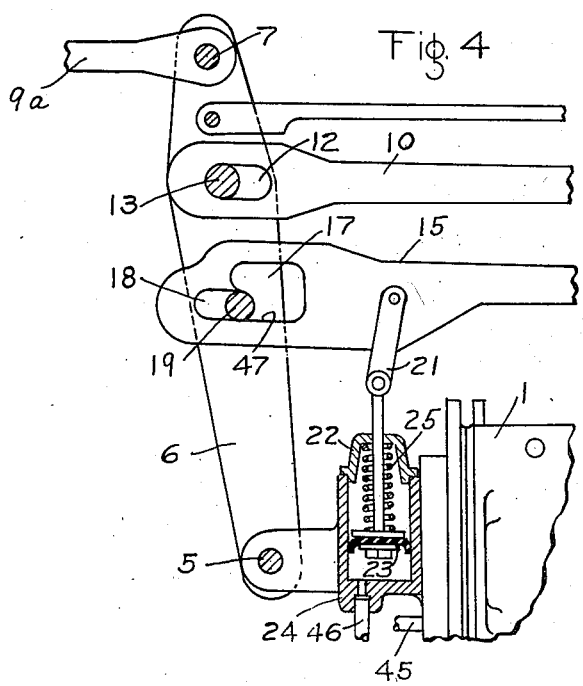
INVENTOR
ANSELME NEVEU
BY
ATTORNEY

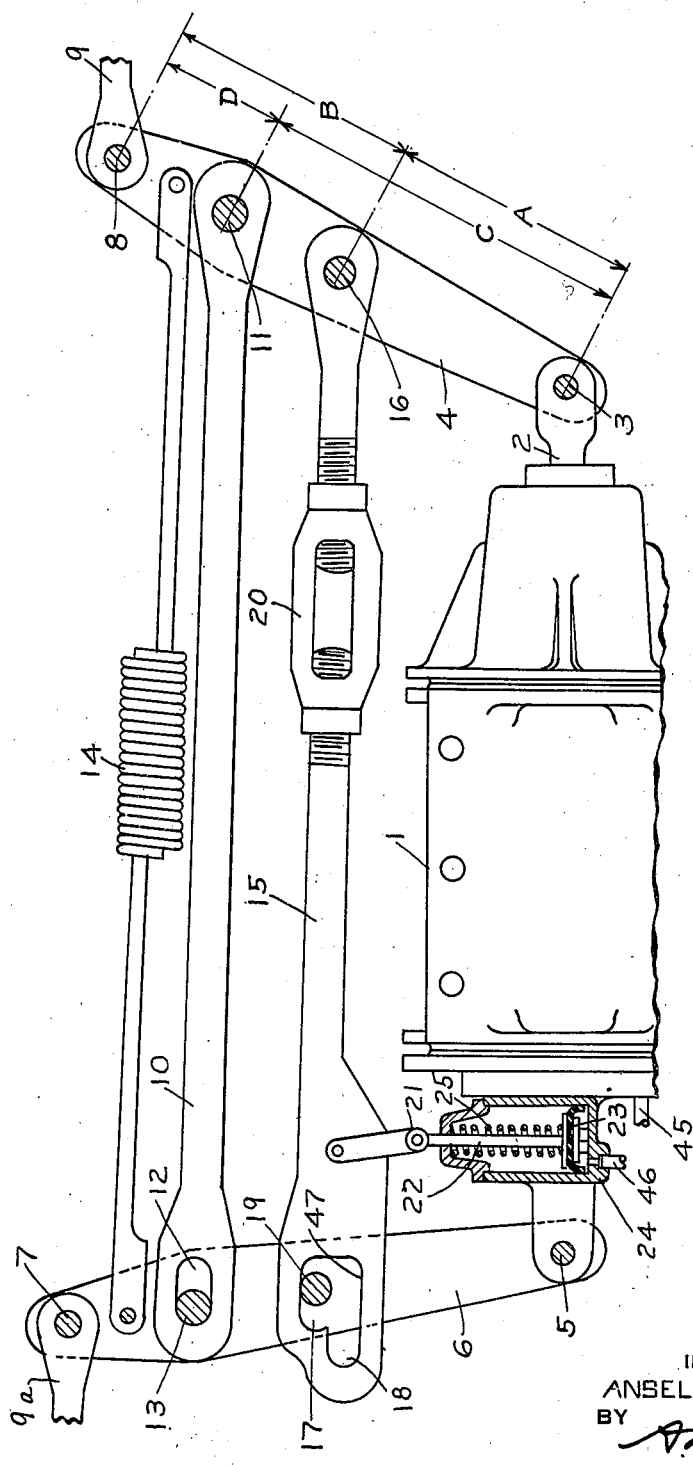

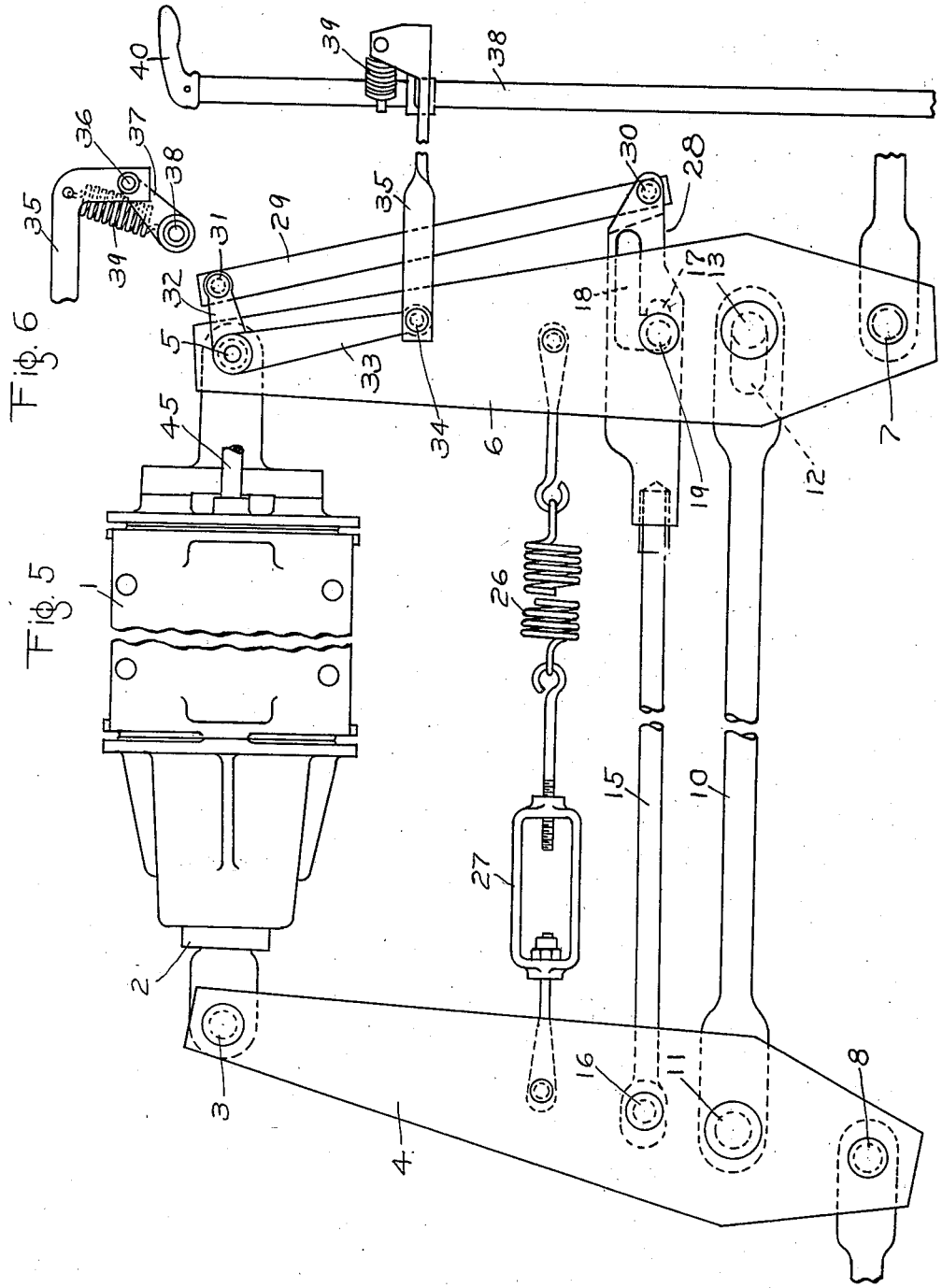

Patented Mar. 24, 1942

2,277,137

UNITED STATES PATENT OFFICE 2,277,137

BRAKE MECHANISM

Anselme Neveu, Livry-Gargan, France, assignor, by mesne assignments, to The Westinghouse Air Brake Company, Wilmerding, Pa., a corporation of Pennsylvania Application August 9, 1939, Serial No. 289,151
In France February 9, 1939

9 Claims. (Cl. 188—195)

This invention relates to fluid pressure braking apparatus for railway and other vehicles of the kind in which the braking effort exerted is arranged to be varied in accordance with the load on the vehicle or other requirements, and has for its object to provide simple and effective arrangements for this purpose.

In the type of braking apparatus to which the invention more particularly relates two brake levers are provided connected at one end respectively to the brake cylinder piston and to the brake cylinder itself or a fixed point on the vehicle frame, the opposite ends of the levers being connected to the brake rigging. Intermediate points in the brake levers are cross-connected by a tie rod, the pivoted connection of the ends of which constitute under certain conditions the fulcra of the brake levers, so that the latter operate with a corresponding leverage in transmitting the braking effort of the brake cylinder to the brake rigging.

According to the principal feature of the invention, a second tie rod is provided, one end of which is pivotally connected to a different intermediate point in one brake lever from the point to which the first tie rod is connected, the other end of this second tie rod being arranged to be operatively coupled to a corresponding different point in the other brake lever or released therefrom by the displacement of this end of the second tie rod according to the load on the vehicle or other conditions. Accordingly, during the application of the brakes, either the first tie rod or the second tie rod is operative and the leverage exerted by the brake levers is correspondingly varied, the fulcra of these levers constituted by the points of connection thereto of the operative tie rod being different according to whether the second tie rod is operatively coupled or not.

The connection of one end of the first tie rod to the corresponding brake lever is so arranged that this rod is inoperative if the corresponding end of the second tie rod is coupled to the brake lever;

The displacement of the second tie rod for the purpose above indicated may be arranged to be effected either manually or automatically as will be hereinafter described.

The invention is illustrated by way of example in the accompanying drawings, Figure 1 of which is a diagrammatic view of a portion of a braking equipment embodying one form of the invention, the parts being shown in release position.

Figure 2 is a similar view of a portion of the apparatus of Figure 1, showing the position of the parts at the beginning of a braking application when the brake blocks have been applied to the vehicle wheels.

Figure 3 is a view similar to Figure 2 showing the position of the parts during the application of braking pressure.

In Figures 1, 2 and 3, the apparatus is shown as adjusted automatically for light load operation, while in Figure 4, which is a view similar to Figures 2 and 3, the apparatus is shown as adjusted for heavy load operation.

Figure 5 is a view similar to Figure 1 of a modified construction in which the adjustment for light or heavy load operation is arranged to be effected manually, instead of automatically, Figure 6 being a view of a constructional detail.

Referring now first to the construction shown in Figures 1, 2, 3 and 4, it will be seen that the braking equipment shown comprises a brake cylinder 1, the brake piston rod 2 of which is pivotally connected at 3 to one end of a brake lever 4. The body of the brake cylinder 1 is similarly pivotally connected at 5 to one end of a brake lever 6, the opposite ends of the levers 6 and 4 being pivotally connected at 7 and 8, respectively, to transmission rods 9 and 9a, forming part of the brake rigging.

Located intermediate the length of the levers 4 and 6 and extending across the space between them are spaced parallel tie rods 10 and 15 which are effective, one at a time, as desired, to operatively connect said levers 4 and 6. The tie rod 15 is adapted to be effective when it is desired to provide a relatively low leverage ratio, as for an empty car, and the tie rod 10 is adapted to be effective when it is desired to provide a higher leverage ratio, as for a loaded car. The levers 4 and 6 are also cross-connected by a return spring device 14 of the compression type, tending to oppose the movement of the upper ends of the brake levers 4 and 6 toward one another.

One end of the tie rod 10 is pivotally connected at 11 to an intermediate point in the brake lever 4, the opposite end of the rod 10 being provided with an elongated slot 12 by means of which this end of the rod 10 is connected to a pivot pin 13 on the brake lever 6 corresponding to the pivot 11 of the other brake lever 4. One end of tie rod 15 is pivotally connected at 16 to the brake lever 4, the opposite end of the rod 15 being somewhat extended and provided with upper and lower elongated slots 17, 18, respectively, in which a pivot pin 19 on the brake lever 6 is adapted to move, the pivot pin 19 corresponding to the pivot pin 16 on the brake lever 4. The tie rod 15 is provided with a turn buckle device 20 by means of which the normal position of the slotted end of the rod 15 relative to the pivot pin 19 can be adjusted. For rendering one or the other of said tie rods 10 and 15 effective, one end of the tie rod 15 is connected by means of a link 21 with a piston rod 22 of a small piston 23 adapted to move in a cylinder 24 to which fluid under pressure on the under side of the piston 23 may be supplied, the piston 23 being provided with a control spring 25 normally maintaining the piston 23 in its downward position as shown in Figures 1, 2 and 3.

The piston 23 and cylinder 24 constitute, as will be evident, a fluid pressure motor device by means of which the slotted end of the tie rod 15 can be caused to occupy its empty load position under the action of the spring 25 when fluid under pressure is vented from the under side of the piston 23, while when fluid under pressure is supplied to the under side of this piston, the latter is moved into the position shown in Figure 4, so as to raise the slotted end of the tie rod 15 into its upper position against the action of the spring 25.

The operation of the apparatus illustrated in Figures 1, 2 and 3 in which the tie rod 15 is shown as adjusted to its light or empty car position is as follows:

The position of the parts of the mechanism when the brakes are fully released is shown in Figure 1, and when an application of the brakes is to be effected fluid under pressure is supplied to the brake cylinder 1 from a brake controlling valve device (not shown) by way of pipe 45, in the usual manner, causing the brake cylinder piston 2 to move outwardly, that is, toward the right, as viewed in Fig. 1 of the drawings. This causes the cylinder lever 4 to rock in a counterclockwise direction about the fulcrum pin 11 and thus causes the tie rod 10 to move toward the right, which when so moved in this direction causes the pivot pin 13 to engage the left hand end of slot 12 in the tie rod 10 to operatively connect the brake levers 4 and 6. This causes the lower ends of the brake levers 4 and 6 to be moved away from one another, so that the pivot pin 19 is moved towards the left until it engages with the left hand end of the upper slot 17 in the slotted end of the tie rod 15. The cylinder levers 4 and 6, as they are thus moved, shift the pull rods 9 and 9a, respectively. The pull rod 9 moves toward the left and the pull rod 9a moves toward the right to effect the operation of the usual truck brake rigging (not shown) at each end of the vehicle. During this part of the movement of the brake levers 4 and 6 (see Fig. 2) which effects the application of the brake shoes to the wheels, it will be understood that the brake levers 4 and 6 are rocked about their pivots 11 and 13, so that the leverage exerted corresponds to that of the lever arms C and D, as indicated in Figure 1.

As soon as the brake shoes are thus applied, continued further outward movement of the brake cylinder piston 2 under the action of the fluid under pressure supplied to the brake cylinder 1, causes brake lever 4 to rock about the pivot 16 and operatively connect the lever 4 to the lever 6 by the tie rod 15. When this occurs the fulcrum point of lever 4 is thus transferred from the pivot pin 11, to the pivot pin 16, and the braking force applied to lever 6 is transferred from pivot pin 13 to pivot pin 19 with the result that the leverage exerted corresponds to the lever arms indicated by A and B, in Figure 1. The rocking movement of the brake levers 4 and 6 under these conditions is evidently permitted by the provision of the elongated slot 12 in the tie rod 10, which permits the pin 13 to move freely in the slot 12, the tie rod 10 (as shown in Figure 3) being no longer operative. It will thus be apparent that the leverage through which the pressure exerted by the brake cylinder 1 is transmitted to the brake rigging by brake applying members 9 and 9a corresponds to that shown at A and B in Figure 1. Now, as the push rod 2 continues to move outwardly the brake shoes are applied against the car wheels, in the usual well known manner, with the brake force transmission that takes place through the tie rod 15, that is, through the low lever ratio.

As a general rule, empty and load brake equipments are provided with a changeover mechanism or control equipment which is arranged to assume load position when the car is carrying a load of more than half of its capacity and is adapted to assume empty position when the car is empty or lightly loaded.

When this control equipment (not shown) is conditioned for load braking fluid under pressure is supplied by way of pipe 46 to the small cylinder 24 below the piston 23, with the result that the left hand end of the tie rod 15 is raised until the bottom face 47 of the slot 18 engages the pivot pin 19 in the brake lever 6.

When it is desired to effect an application of the brakes with the equipment thus conditioned for load braking fluid under pressure is supplied in the usual manner to the brake cylinder 1 by way of pipe 45. When the brake cylinder push rod 2 is moved outwardly and cylinder lever 4 is rotated about the pivot pin 11, in effecting an application of the brakes, the fulcrum pin 11 and the tie rod 10 become substantially immediately effective for taking up the slack in the rigging and applying the brake shoes against the car wheels.

Under these conditions (see Fig. 4), when the brake shoes have been applied to the wheels, further outward movement of the lower end of the brake lever 4, causes the pivot pin 19 to move freely in the lower slot 18 so that the brake lever 4 still continues to rock about the pivot 11, and through the medium of the rod 10 apply braking force at the pivot pin 13 on lever 6 and with the fulcrum of the brake lever 4 and pivot point 13 on lever 6 thus unaltered throughout their whole course of movement to apply the brakes and to exert the required braking pressure. The leverage exerted by the brake levers 4 and 6, thus remains as indicated at C and D in Figure 1, that is to say, at a higher value than under the conditions previously described for an empty or lightly loaded vehicle.

Referring now to the modified construction shown in Figure 5, the brake levers 4 and 6 are in this case shown as cross-connected by a return spring device 26 of the tension type provided with an adjusting turn buckle 27. The tie rod 10 is pivotally connected, as in the previous construction, to the brake levers 4 and 6, at 11 and 13, the tie rod 15 being pivotally connected to the brake lever 4 at 16, while the opposite end of this tie rod is provided with an extension 28 adjustably connected to the rod 15 and provided with slots 17 and 18 for the pivot pin 19, corresponding to the slots bearing the same reference numerals in the preceding figures. The displacement of the extension 28 at one end of the tie rod 15 is effected by means of a link 29, one end of which is pivotally connected at 30 to the extension 28, the other end of the link 29 being pivotally connected at 31 to the shorter arm 32 of a bell crank lever mounted on the pivot 5 of the brake lever 6. The longer arm 33 of this bell crank lever is pivotally connected at 34 to one end of an operating rod 35, the opposite end of which is bent over and pivotally connected at 36 (see Figure 6) to an arm 37 rigidly secured to an operating shaft 38. A toggle spring 39 is connected between the end of the shaft 35 and the operating shaft 38 as shown in Figure 6, and the shaft 38 is provided with an adjusting handle 40.

The operation of the apparatus shown in Figure 5 is as follows:

When the vehicle is empty or lightly loaded, the parts of the mechanism occupy the position shown in Figure 5, and during an application of the brakes the brake lever 4 is rocked about the pivot 11 and the force is applied to lever 6 at pivot pin 13 in a manner similar to that described in connection with the preceding figures, the brake levers 4 and 6, operating through their pivots 11 and 13 during the application of the brake shoes to the wheels, while when the brake shoes are fully applied so that the pivot pin 19 is at the right hand end of the slot 17, the fulcrum of the brake lever 4 and the point on lever 6 at which the force is applied is transferred to the pivot pins 16 and 19 for the subsequent rocking movement of the brake levers, the transmission of the braking effort from the brake piston 2 to the brake rigging apply members 9 and 9a being effected with the reduced leverage indicated by A and B in Fig. 1 suitable for an empty or lightly loaded vehicle.

When, on the other hand, the vehicle is carrying a load of more than half of its capacity, the shaft 38 is rotated by means of the handle 40 so as to move the rod 35 towards the left and thereby, through the bell crank lever arms 32, 33, and the link 29, move the extension 28 to its lower position in which the pivot pin 19 is located in the slot 18. Under these conditions, when a brake application is effected, the brake lever 4 will evidently rock about the pivot pin 11 and through the medium of the rod 10 will apply braking force to lever 6 by means of pivot pin 13, throughout the whole movement of these brake levers, as before described, and the leverage involved will be that indicated by the letters C and D in Fig. 1 corresponding to a loaded vehicle. The toggle spring 39, as will be apparent, ensures that the arm 37 and the operating shaft 38 shall be definitely retained in one or the other of their extreme positions corresponding to empty and load, respectively.

Thus, it will be seen that when the apparatus is set for empty car braking, the tie rod 15 is effective after the brake cylinder push rod has moved outwardly a predetermined distance in effecting an application of the brakes, as determined by the length of the slot 17 in the tie rod 15, the tie rod 10 remaining ineffective after the clearance has been taken up during the application. Also, when the apparatus is adjusted for loaded car braking, the tie rod 10 becomes substantially immediately effective upon outward movement of the push rod 2 through the medium of fulcrum pin 16, the tie rod 15 remaining ineffective.

It is evident that since the fulcrum pin 11 is disposed at a greater distance from the push rod than is the fulcrum pin 16 the leverage ratio provided by it is greater than when the pin 16 is effective as a fulcrum. In other words, with pin 11 effective as a fulcrum, a greater pull is applied to the pull rods 9 and 9a, with a given pressure acting in the brake cylinder, than when the pin 16 is effective.

It will be seen from the foregoing that I have provided improved means for shifting the fulcrum point of a brake cylinder lever so as to provide a higher leverage ratio for a loaded car than for an empty car and at the same time maintain a substantially uniform brake cylinder piston travel.

The braking equipment illustrated may evidently be provided with a slack adjuster device (not shown) interposed in the brake rigging at any suitable point or points as will be readily understood without detailed explanation.

While one form of shifting the fulcrum point of a brake cylinder lever embodying my invention, together with one automatic and one manual changeover mechanism which may be employed for control, have been illustrated and described in detail, it should be understood that the invention is not limited to these details of construction and that numerous modifications and changes may be made without departing from the scope of the following claims.

Having now described my invention, what I claim as new and desire to secure by Letters Patent, is:

1. In a brake system, in combination, a pair of brake levers operative to effect an application of the brakes, means for actuating said levers, a pair of rods each of which has at the end thereof a slot, two pivot pins associated with one of said brake levers and adapted to be operatively related to said slots in said pair of rods, and fluid pressure operated means associated with one of said rods for controlling the operative relation between said slots and said pins in a manner to cause one of said rods to become effective to establish one leverage ratio for said levers and the other of said rods to become effective to establish a different leverage ratio for said pair of brake levers.

2. The combination in a brake system of a brake cylinder having a push rod operated to supply braking power, a pair of brake levers, one of said brake levers being connected at one end to said push rod and the other being pivotally connected at one end to a fixed point, a brake applying member connected to the opposite end of each of said levers, a first rod adapted to be pivotally connected at opposite ends to said brake levers in a manner to provide a certain leverage ratio for the levers, a second rod adapted to be connected at one end to one of said brake levers and having at its opposite end two slots, a pivot pin associated with the other of said brake levers and adapted to cooperate with one or the other of said two slots to render one or the other of said rods effective in establishing the leverage ratio for said brake levers when they are operated, and means for controlling which of said two slots said pin cooperates with at any one time.

3. The combination in a brake system of a brake cylinder having a push rod operated to supply braking power, a pair of brake levers one of which is connected at one end to said push rod and the other of which is pivotally connected at one end to a fixed point, a brake applying member connected to the opposite end of each of said levers, a first rod adapted to be pivotally connected at its opposite ends to said brake levers and to be effective at one time to provide a certain leverage ratio for each of the brake levers, a second rod adapted to be connected at one end to one of said brake levers and having at its opposite end two connected slots, and a pivot pin associated with the said other lever adapted to cooperate with one or the other of said two slots to provide a different leverage ratio for each of said brake levers, said first rod being initially rendered effective and then ineffective and said second rod being initially rendered ineffective and then effective when said pin cooperates with one of said slots and said first rod being rendered effective and said second rod being rendered ineffective when said pin cooperates with the other of said slots.

4. In a brake system, in combination, a pair of oppositely disposed levers operative upon rotation in opposite directions about fulcrums to effect an application of the brakes, means for actuating said levers, a first member adapted to be pivotally connected at opposite ends to said levers and operative to establish fulcrums for the levers, a second member adapted to be pivotally connected to said levers to establish different fulcrums therefor, said second member having two positions and being operative in one position to connect said levers together and to effectively disconnect said first member therefrom, and operative in the other position to render said first member effective and said second member ineffective, and a movable abutment connected to said second member, said movable abutment being operative when subject to fluid under pressure on one side thereof to render said second member ineffective and said first member effective to establish fulcrums for said levers, and operative when not subject to fluid under pressure to render said first member initially effective and then ineffective and said second member initially ineffective and then effective to establish fulcrums for said levers.

5. In a brake system, in combination, a pair of oppositely disposed levers operative upon rotation in opposite directions about fulcrums to effect an application of the brakes, a brake cylinder for actuating said levers, a pair of members connected to said levers for providing different fulcrums for said levers, and a movable abutment associated with the pressure head of said brake cylinder and connected to one of said members, said abutment being urged by a spring acting on one side thereof to a normal position in which one of said members is effective to establish a fulcrum for said levers, and being movable to another position upon the supply of fluid under pressure to the other side of said abutment in opposition to the pressure of the spring for rendering the other member effective to establish another fulcrum for said levers.

6. The combination with a fluid pressure operated brake cylinder having a push rod operated to supply braking power, of a pair of brake levers one of which is connected at one end to said push rod, and the other of which is pivotally connected at one end to a fixed point, a braking applying member connected to the opposite end of each of said levers, a pair of rods adapted to be operatively connected to said levers, one of said rods being effective to provide one leverage ratio and the other being effective to provide a different leverage ratio for said levers, one of said rods being movable to one or the other of two positions to render one or the other of said rods effective, a bell crank lever connected to said fixed point and having two arms one of which is connected to said two-position rod, and manually operated means connected to the other of said two arms for actuating said two-position rod to one or the other of its said two positions.

7. The combination with a fluid pressure operated brake cylinder having a push rod operated to supply braking power, of a pair of brake levers one of which is connected at one end to said push rod, and the other of which is pivotally connected at one end to a fixed point, a braking applying member connected to the opposite end of each of said levers, a pair of rods adapted to be operatively connected to said levers, one of said rods being effective to provide one leverage ratio and the other being effective to provide a different leverage ratio for said levers, one of said rods being movable to one or the other of two positions to render one or the other of said rods effective, a shaft adapted to be rotated into one or the other of two extreme positions for moving said one rod to one or the other of its two positions, means for connecting said rod to said shaft, and means associated with said shaft for retaining said shaft in one or the other of its extreme positions when rotated thereto.

8. The combination with a brake cylinder having a push rod operated to supply braking power, of a pair of brake levers one of which is connected at one end to said push rod and the other of which is pivotally connected at one end to a fixed point, a brake applying member connected to the opposite end of each of said levers, a first rod adapted to be pivotally connected at opposite ends to said brake levers and operative when so connected to establish fulcrums for said levers, a second rod adapted to be connected at one end to one of said brake levers and having at its opposite end two slots, a pivot pin associated with the other of said brake levers and adapted to cooperate with one or the other of said slots to render one or the other of said rods effective in establishing fulcrums for said brake levers when they are operated, and a shaft adapted to be rotated to one or the other of two extreme positions for controlling which of said slots said pin will cooperate with, a spring for retaining said shaft in one or the other of said two extreme positions when rotated thereto, and a lever arrangement for connecting said second rod to said shaft.

9. In a brake system, in combination, a pair of brake levers operative to effect an application of the brakes, means for actuating said lever, a pair of rods each of which has at the end thereof a slot, two pivot pins associated with one of said brake levers and adapted to be operatively related to said slots in said pair of rods, and fluid pressure operated means for controlling the operative relation between said pins and said slots, said fluid pressure means being operative upon the release of fluid under pressure therefrom for controlling the operative relation between said slots and said pins in a manner to cause said rods to establish first one and then the other of two fulcrums to come into action so as to provide different leverage ratios for said brake levers during one braking operation, and operative upon the supply of fluid under pressure thereto for controlling the operative relation between said slots and said pins in a manner to cause one of said rods to establish a fulcrum for said levers so as to provide one leverage ratio which is maintained throughout during another braking operation.

ANSELME NEVEU.